United States Patent
Fleisher

(10) Patent No.: US 7,119,731 B2
(45) Date of Patent: Oct. 10, 2006

(54) DEPTH-BASED SURVEILLANCE IMAGING

(75) Inventor: Michael Fleisher, Sunnyvale, CA (US)

(73) Assignee: SafeView, Inc., Santa Clara, CA (US)

( * ) Notice: Subject to any disclaimer, the term of this patent is extended or adjusted under 35 U.S.C. 154(b) by 76 days.

(21) Appl. No.: 11/040,597

(22) Filed: Jan. 21, 2005

(65) Prior Publication Data

US 2006/0164285 A1    Jul. 27, 2006

(51) Int. Cl.
 *G01S 13/89* (2006.01)
(52) U.S. Cl. .................. 342/22; 342/27; 342/179; 342/181
(58) Field of Classification Search .......... 342/22, 342/27, 179, 181; 382/100, 103, 181, 190; 348/143; 340/522; 250/221
See application file for complete search history.

(56) References Cited

U.S. PATENT DOCUMENTS

| | | |
|---|---|---|
| 4,866,424 A | 9/1989 | Parks |
| 4,901,084 A | 2/1990 | Huguenin et al. |
| 4,910,523 A | 3/1990 | Huguenin et al. |
| 4,940,986 A | 7/1990 | Huguenin |
| 5,047,783 A | 9/1991 | Hugenin |
| 5,073,782 A | 12/1991 | Huguenin et al. |
| 5,170,169 A | 12/1992 | Stephan |
| 5,202,692 A | 4/1993 | Huguenin et al. |
| 5,227,800 A | 7/1993 | Huguenin et al. |
| 5,367,552 A | 11/1994 | Peschmann |
| 5,455,590 A | 10/1995 | Collins et al. |
| 5,557,283 A | 9/1996 | Sheen et al. |
| 5,600,303 A | 2/1997 | Husseiny et al. |
| 5,760,397 A | 6/1998 | Huguenin et al. |
| 5,859,609 A | 1/1999 | Sheen et al. |
| 6,057,761 A | 5/2000 | Yukl |
| 6,078,047 A | 6/2000 | Mittleman et al. |
| 6,088,423 A | 7/2000 | Krug et al. |
| 6,094,472 A | 7/2000 | Smith |
| 6,342,696 B1 | 1/2002 | Chadwick |
| 6,469,624 B1 | 10/2002 | Whan et al. |
| 6,507,309 B1 | 1/2003 | McMakin et al. |
| 6,518,915 B1 | 2/2003 | Schutz et al. |
| 6,665,373 B1 | 12/2003 | Kotowski et al. |
| 6,703,964 B1 | 3/2004 | McMakin |
| 6,791,487 B1 | 9/2004 | Singh et al. |
| 2002/0159334 A1* | 10/2002 | Caulfield ............... 367/87 |
| 2004/0090359 A1 | 5/2004 | McMakin |

(Continued)

OTHER PUBLICATIONS

Park, Sung Cheol, Park, Min Kyu and Kang, Moon Gi, *Super-Resolution Image Reconstruction: A Technical Overview*, IEEE Signal Processing Magazine, vol., 20, No. 3, pp. 21-36, May 2003.

Segall, C. Andrew, Molina, Rafael and Katsaggelos, Aggelos K, *High-Resolution Images From Low Resolution Compressed Video*, IEEE Signal Processing Magazine, vol., 20, No. 3, pp. 37-48, May 2003.

(Continued)

*Primary Examiner*—Dan Pihulic
(74) *Attorney, Agent, or Firm*—Kolisch Hartwell, PC

(57) ABSTRACT

A subject may be interrogated with electromagnetic radiation for producing image data representative of an image of the subject. First and second image data, produced based on reflectivity in first and second frequency ranges, may be related. In some examples, image data for one picture element may be produced based at least in part on reflectivity of the radiation at a depth selected based at least in part on a depth of another picture element. In some examples, plural images may be produced based on reflectivity at different depths. In some examples, a value of reflectivity may be determined for an intermediate depth between two adjacent depths of image data based at least in part on reflectivity of the radiation for a plurality of spaced-apart depths.

22 Claims, 13 Drawing Sheets

U.S. PATENT DOCUMENTS

2004/0140924 A1    7/2004    Keller
2004/0263379 A1   12/2004    Keller
2005/0030219 A1    2/2005    Friedrich

OTHER PUBLICATIONS

Rajan, Deepu, Chaudhuri, Subhasis and Joshi, Manjunath V., *Multi-Objective Super Resolution: Concepts and Examples*, IEEE Signal Processing Magazine, vol., 20, No. 3, pp. 49-61, May 2003.

Ng, Michael K. and Bose Nirmal K., *Mathematical Analysis of Super-Resolution Methodology*, IEEE Signal Processing Magazine, vol., 20, No. 3, pp. 62-74, May 2003.

Capel, David and Zisserman, Andrew, *Computer Vision Applied to Super Resolution*, IEEE Signal Processing Magazine, vol., 20, No. 3, pp. 75-102, May 2003.

Vollmerhausen, Richard H. and Driggers, Ronald G., *Dynamic Sampling, Resolution Enhancement, and Super Resolution*, Analysis of Sampled Imaging Systems, Chapter 6, pp. 125-138, 2002.

Laws, Kenneth I., *Goal-Directed Texture-Image Segmentation*, SPIE, vol. 548 Applications of Artificial Intelligence II, pp. 19-26, 1985.

Laws, Kenneth I., *Rapid Texture-Image Segmentation*, SPIE, vol. 238 Image Processing for Missile Guidance, pp. 376-381, 1980.

* cited by examiner

Fig. 18
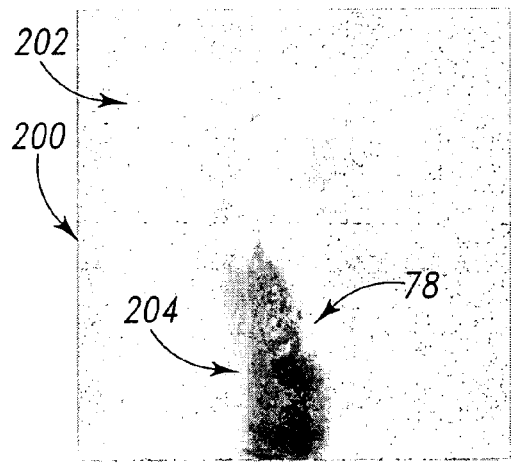 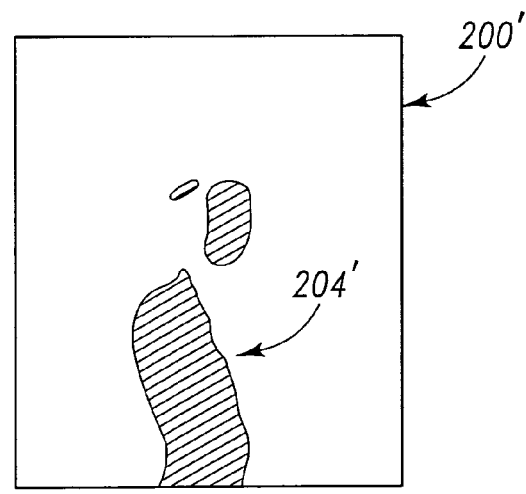
Fig. 19A  Fig. 19B

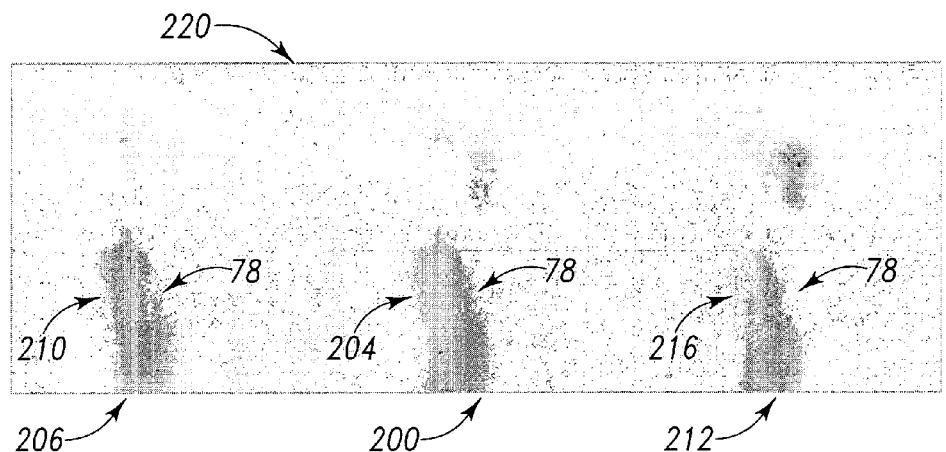
Fig. 22
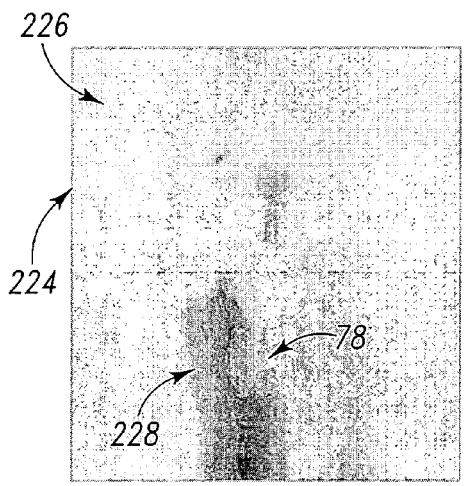 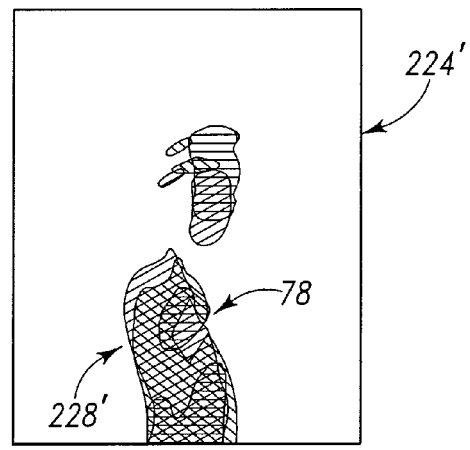
Fig. 23A    Fig. 23B

DEPTH-BASED SURVEILLANCE IMAGING

BACKGROUND

Millimeter wave signals are used for radar and telecommunications. They are also capable of being used to produce data representative of a subject, by directing millimeter-wave signals at the subject and detecting the reflected signal. The data produced may then be used to produce an image of the subject. Examples of such imaging systems are described in U.S. Pat. Nos. 5,455,590; 5,557,283; 5,859,609; 6,507,309; and 6,703,964; and U.S. Patent Publication Nos. 2004/90,359; 2004/140,924; and 2004/263,379, which patent references are incorporated herein by reference.

BRIEF SUMMARY OF THE DISCLOSURE

A method for imaging a subject may include, or an imaging system may provide, interrogating the subject with electromagnetic radiation, and producing, from the interrogating, image data representative of at least a first image of at least a portion of the subject. In some examples, the electromagnetic radiation may include radiation in first and second frequency ranges, with first and second image data being produced based on reflectivity of the electromagnetic radiation in the first and second frequency ranges, and the first and second image data being related. In some examples, first image data may be for a plurality of depths for each of a plurality of picture elements, with at least second image data being produced that is representative of at least a first image of at least the portion of the subject based at least in part on reflectivity of the electromagnetic radiation at a second depth selected based at least in part on the first depth of at least another one of the picture elements. In some examples, first image data may be for a plurality of depths for each of a plurality of picture elements, with plural images produced based on reflectivity at different depths. In some examples, the first image data may be based at least in part on reflectivity of the electromagnetic radiation for a plurality of spaced-apart depths for each of a plurality of adjacent picture elements, and a value of reflectivity determined for an intermediate depth between two adjacent depths.

BRIEF DESCRIPTION OF THE SEVERAL FIGURES

FIG. 18 is an image of reflectance values using the depths shown in FIG. 17.

FIG. 19A is an image produced by using reflectance values in a first depth plane.

FIG. 19B is an image illustrating generally the areas of higher reflectance values in the image of FIG. 19A.

FIG. 22 is an image formed as a set of side-by-side images of FIGS. 19A, 20A and 21A.

FIG. 23A is an image formed by combining the images of FIGS. 19A, 20A and 21A.

FIG. 23B is an image illustrating generally the respective contributions of the three images of FIGS. 19A, 20A and 21A in the image of FIG. 23A.

DETAILED DESCRIPTION OF VARIOUS EMBODIMENTS

There are situations in which it is desirable to identify features of a subject, particularly features of a person and any objects carried by the person. For example, it may be desired to determine whether the subject includes objects not apparent from a visual inspection of the subject. For example, when monitoring people prior to entry into a controlled-access environment, such as a public, private or government facility, building or vehicle, observations may be facilitated by employing millimeter-wave imaging technology. Regardless of the application, the benefits derived from the monitoring may depend on the speed and accuracy of the monitoring, and where appropriate, the effectiveness of identifying visually hidden objects. Techniques and systems that provide increased accuracy of imaging and distinguish differences in related images may be beneficial.

In the description and claims that follow, the terms feature and characteristic may be synonymous. For example, intensity, color, depth or distance relative to a reference, and values of intensity, color or depth may be features or characteristics of image data, and thereby an image or picture element of an image.

Imaging Systems

Figure 1:
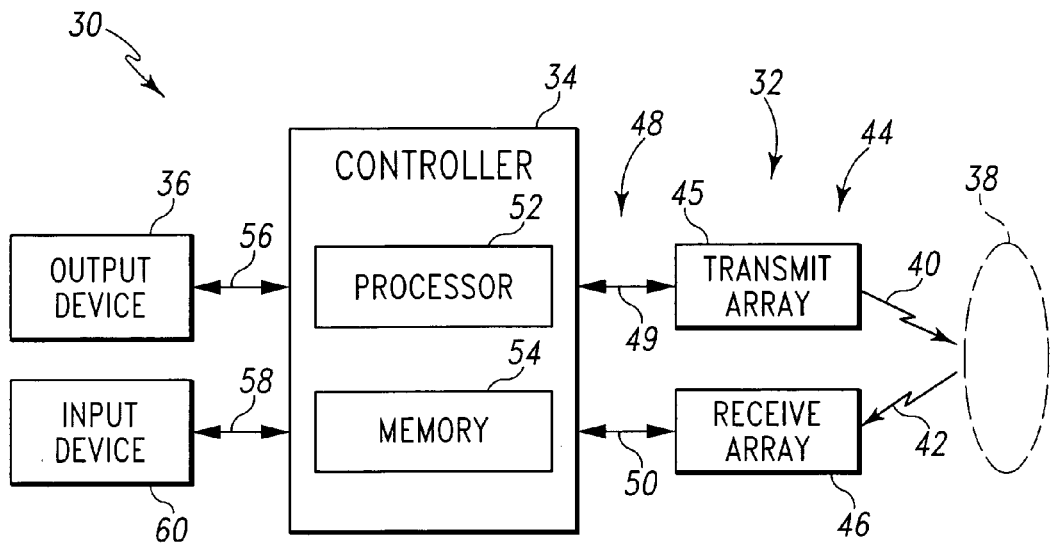
FIG. 1 is a general diagram showing an imaging system.

Shown generally at 30 in FIG. 1 is an exemplary imaging system. System 30 may include an interrogating apparatus 32, a controller 34, and in some systems, an output device 36. The system may interrogate a subject 38 in the sense that the interrogating apparatus transmits electromagnetic radiation 40 toward the subject, and in response, the subject emits or reflects electromagnetic radiation 42 that is detected by the interrogating apparatus.

Subject 38 may include all that is presented for interrogation by an interrogation system, whether human, animal, or inanimate object. For example, if a person is presented for interrogation, subject 38 may include the entire person's body or a specific portion or portions of the person's body. Optionally, subject 38 may include one or more persons, animals, objects, or a combination of these.

System 30 may be adapted to interrogate subject 38, through interrogation apparatus 32, by irradiating it with electromagnetic radiation, and detecting the reflected radiation. Electromagnetic radiation may be selected from an appropriate frequency range, such as in the range of about 100 megahertz (MHz) to 2 terahertz (THz), which range may be generally referred to herein as millimeter-wave radiation. Accordingly, imaging, or the production of images from the detected radiation, may be obtained using electromagnetic radiation in the frequency range of one gigahertz (GHz) to about 300 GHz. Radiation in the range of about 5 GHz to about 110 GHz may also be used to produce acceptable images. Some imaging systems use radiation in the range of 24 GHz to 30 GHz. Such radiation may be either at a fixed frequency or over a range or set of frequencies using one or more of several modulation types, e.g. chirp, pseudorandom frequency hop, pulsed, frequency modulated continuous wave (FMCW), or continuous wave (CW).

Certain natural and synthetic fibers may be transparent or semi-transparent to radiation of such frequencies and wavelengths, permitting the detection and/or imaging of surfaces positioned beneath such materials. For example, when the subject of interrogation is an individual having portions of the body covered by clothing or other covering materials, information about portions of the subject's body covered by such materials can be obtained with system 30, as well as those portions that are not covered. Further, information relative to objects carried or supported by, or otherwise with a person beneath clothing can be provided with system 30 for metal and non-metal object compositions.

Many variations of interrogating apparatus 32 are possible. For example, the interrogating apparatus may include one or more antenna arrays 44, such as a transmit array 45 of one or more antenna units, each of which may further include a single antenna that transmits radiation 40 or a plurality of antennae that collectively transmit radiation. A receive array 46 may receive radiation 42 reflected from subject 38. Optionally, some embodiments may employ one or more antennae apparatus as described in U.S. patent application Ser. No. 10/728,456 filed Dec. 5, 2003, entitled "Millimeter-Wave Active Imaging System", the disclosure of which is incorporated herein by reference. Optionally, each antenna unit may both transmit and receive radiation.

Depending on the interrogating apparatus, an imaging system may include an apparatus moving mechanism, not shown, that may move interrogating apparatus 32 relative to a subject 38, for scanning the subject with one or more transmit and/or receive arrays.

Interrogating apparatus 32 may be coupled to controller 34. As contemplated herein, the controller may include structure and functions appropriate for generating, routing, processing, transmitting and receiving millimeter-wave signals to and from the interrogating apparatus. The controller, in this comprehensive sense, may include multiplexed switching among individual components of the interrogating apparatus, transmit electronics, receive electronics, and mechanical, optical, electronic, and logic units. The controller thus may send to and receive from the interrogating apparatus signals 48, such as transmit-related signals 49 and receive-related signals 50, respectively. Signals 48 may include appropriate signals, such as control signals and image-related signals.

Controller 34 may include hardware, software, firmware, or a combination of these, and may be included in a computer, computer server, or other microprocessor-based system capable of performing a sequence of logic operations. In addition, processing may be distributed with individual portions being implemented in separate system components.

Accordingly, controller 34 may include a processor 52 and a memory 54. Controller components such as output devices, processors, memories and memory devices, and other components, may be wholly or partly co-resident in interrogation apparatus 32 or be wholly or partly located remotely from the interrogation apparatus.

Processor 52 may process data signals received from the interrogating apparatus. The processor thus may include hardware, software, firmware, or a combination of these, and may be included in a computer, computer server, or microprocessor-based system capable of performing a sequence of logic operations. The processor may be any analog or digital computational device, or combination of devices, such as a computer(s), microprocessor(s), or other logic unit(s) adapted to control interrogating a subject and receiving signals 50, and to produce image data 56 representative of at least a portion of the subject interrogated.

The description that follows is presented largely in terms of display images, algorithms, and symbolic representations of operation of data bits within a computer memory. Software, firmware, and hardware encompassing such representations may be configured many different ways, and may be aggregated into a single processor and program with unclear boundaries.

An algorithm is generally considered to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. When stored, they may be stored in any computer-readable medium. As a convention, these signals may be referred to as bits, values, elements, symbols, characters, images, data, terms, numbers, or the like. These and similar terms may be associated with appropriate physical quantities and are convenient labels applied to these quantities.

In the present case, the operations may include machine operations that may be performed automatically and/or in conjunction with a human operator. Useful machines for performing the operations disclosed include general-purpose digital computers, microprocessors, or other similar devices. The present disclosure also relates to apparatus for performing these operations. This apparatus may be specially constructed for the required purposes or it may comprise a general-purpose computer selectively activated or reconfigured by a computer program stored in the computer or other apparatus. In particular, various general-purpose machines may be used with programs in accordance with the teachings herein, or it may prove more convenient to construct more specialized apparatus to perform the required method steps.

A program or programs embodying the disclosed methods need not reside in a single memory, or even a single machine. Various portions, modules or features of them can reside in separate memories, or even separate machines. The separate machines may be connected directly, or through a network, such as a local access network (LAN), or a global network, such as what is presently generally known as the Internet. Similarly, the machines need not be collocated with each other.

Image data may include any data or data sets, whether processed, partially processed or unprocessed, or sub-sets of the data, such as: data for a portion of a subject; data that is manipulated in order to identify information corresponding to one or more given features of a subject; data that is manipulated in order to present, for viewing by an operator or by another processor, information corresponding to one or more given features of a subject; or measurements or other information relating to a subject that is derived from received signals. Image data 56 may be output to one or more output devices 36 coupled to processor 52, such as a storage medium or device, communication link, such as a network hub, another computer or server, a printer, or directly to a display device, such as a video monitor. Processor 52 may also be coupled to receive input signals 58 from an input device 60, such as a keyboard, cursor controller, touch-screen display, another processor, a network, or other device, communication link, such as a source of information for operating the system or supplemental information relating to a given subject.

In some embodiments, processor 52 may be coupled to memory 54 for storing data, such as one or more data sets produced by processor 52, or operating instructions, such as instructions for processing data. Memory 54, referred to generally as storage media, may be a single device or a combination of devices, and may be local to the processor or remote from it and accessible on a communication link or network. Operating instructions or code may be stored in memory 54, along with image data, and may be embodied as hardware, firmware, or software.

Data produced or accessed by the processor may thus be sent to and retrieved from memory 54 for storage. In some examples, data produced from interrogating a given subject or input from another source may be retrieved for further processing, such as identifying information corresponding to a feature of the subject, for modifying image data, or for producing an image of a subject or portion of a subject derived from received signals. In such examples, the processor may be configured to identify or compare information corresponding to the features, such as identification of image features obtained from data produced by radiation in different frequency ranges, or at different depths relative to a reference.

Figure 2:
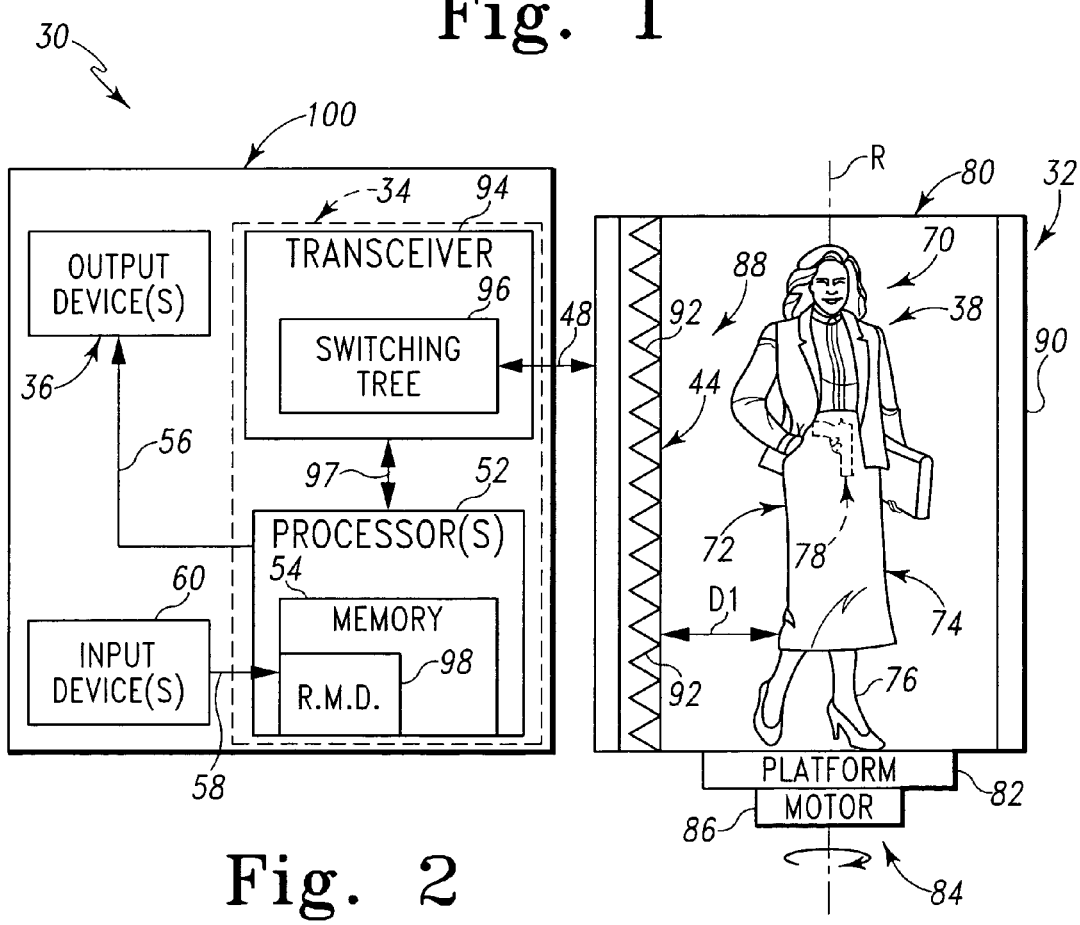
FIG. 2 is a general diagram showing an example of a surveillance imaging system according to FIG. 1.

An imaging system, such as that illustrated in FIG. 1, may be used for interrogating in a variety of applications in which the controller may be configured to identify and/or process information in one or more data sets corresponding to one or more features of a subject, such as image data relating to a subject. A second example of an imaging system 30 is illustrated in FIG. 2. In imaging system 30, a subject 38 in a subject position 70 may include a person 72 presented for interrogation by system 30. Person 72 is shown wearing clothing 74 over her or his body 76, which clothing conceals an object 78, shown in the form of a weapon. Subject 38 may be positioned in an interrogation station or portal 80 of system 30. Portal 80 may be configured in various ways for placement at a security checkpoint where it is desired to detect objects, such as weapons or contraband, on a person or other subject. Portal 80 may include, for example, a platform 82 connected to a motion mechanism 84 in the form of motor 86. Platform 82 may be arranged to support subject 38. Motor 86 may be arranged to rotate selectively the platform about rotational axis R while subject 38 is positioned thereon. For the configuration shown, axis R may be vertical, and subject 38 may be in a generally central subject position 70 relative to axis R and platform 82.

Interrogating apparatus 32 may include an antenna apparatus 88 including a primary multiple-element sensing array 44. The interrogating apparatus 32 may include a frame 90 on which array 44 is supported. Array 44 may extend the full height of frame 40. Motor 38 may cause platform 82, and subject 38 to rotate about axis R. As a result, array 34 circumscribes a generally circular pathway about axis R. The antenna array may be positioned relative to the subject as is appropriate. In some examples, the antenna array is about 0.5 to about 2 meters from the subject position.

In this example, antenna array 44 may include a number of linearly arranged antenna elements 92 only a few of which are schematically illustrated. Each element 92 may be dedicated to transmission or reception of radiation or both, and the elements may be arranged in two generally vertical columns, with one column dedicated to transmission, and the other to reception. The number and spacing of the elements corresponds to the wavelengths used and the resolution desired. A range of 200 to about 600 elements can span a vertical length of about two or two and one-half meters.

Various other configurations for portal 80 and interrogating apparatus 32 may be used. For example, a two-dimensional transmit and receive array may be used, as well as an array that moves around a fixed subject platform, or an array that moves vertically and extends horizontally. Further, many variations of an antenna apparatus are possible. The antenna apparatus may include one or more antenna units, and each antenna unit may include one or more transmitting antennae and/or one or more receiving antennae. An antenna unit may include a plurality of antennae that may receive radiation in response to transmission by a single antenna. The antennae may be any appropriate type configured to transmit or receive electromagnetic radiation, such as a slot line, patch, endfire, waveguide, dipole, semiconductor, or laser. Antennae may both transmit and receive. The antenna units may have one or more individual antennae that transmit or receive like polarization or unlike polarized waveforms, such as plane, elliptical, or circular polarization, and may have narrow or broad angular radiation beam patterns, depending on the application. Beam width may be relatively broad, i.e. 30 to 120 degrees for imaging applications that use holographic techniques, while narrow beam widths in the range of 0 to 30 degrees may be used for applications having a narrow field of view requirement.

Further, a single antenna may scan a subject by mechanically moving about the subject in a one- or two-dimensional path. A one- or two-dimensional array of antenna units may electronically and mechanically scan a subject. An interrogating apparatus may include one or a plurality of transmit and/or receive antenna apparatus. The antennae apparatus may be protected from the environment by suitable radome material, which may be part of the apparatus, or separate, depending on the mechanical motion that is required of the antennae apparatus or array. Examples of other array configurations are illustrated in copending U.S. patent application Ser. No. 10/728,456.

A controller 34 may control operation of interrogating apparatus 32. Controller 34 may include a transceiver 94 including a switching tree 96 configured to irradiate subject 38 with only one transmitting element 92 at a time, and simultaneously receive with one or more elements 92. Transceiver 94 may include logic to direct successive activation of each combination of transmit and receive antenna elements to provide a scan of a portion of a subject 38 along a vertical direction as platform 82 and the subject rotate. Other configurations of transceiver 94 may be used. For example, the transceiver may include structurally and/or electrically separate transmitter(s) and receiver(s).

An image signal 50 received from array 44 may be downshifted in frequency and converted into an appropriate format for processing. In one form, transceiver 94 may be of a bi-static heterodyne Frequency Modulated Continuous Wave (FM/CW) type like that described in U.S. Pat. No. 5,859,609. Other examples are described in U.S. Pat. Nos. 5,557,283 and 5,455,590. In other embodiments, a mixture of different transceiver and sensing element configurations with overlapping or non-overlapping frequency ranges may be utilized, and may include one or more of the impulse type, monostable homodyne type, bi-static heterodyne type, and/or other appropriate type.

Transceiver 94 may provide image data 97 corresponding to the image signals to one or more processors 52. Processor 52 may include any suitable component for processing the image data, as appropriate. Processor 52 may be coupled to a memory 54 of an appropriate type and number. Memory 54 may include a removable memory device (R.M.D.) 98, such as a tape cartridge, floppy disk, CD-ROM, or the like, as well as other types of memory devices.

Controller 34 may be coupled to motor 86 or other drive element used to control selectively the rotation of platform 82. Controller 34 may be housed in a monitor and control station 100 that may also include one or more input devices 60, such as operator or network input devices, and one or more displays or other output devices 36.

General Imaging Method

Figure 3:
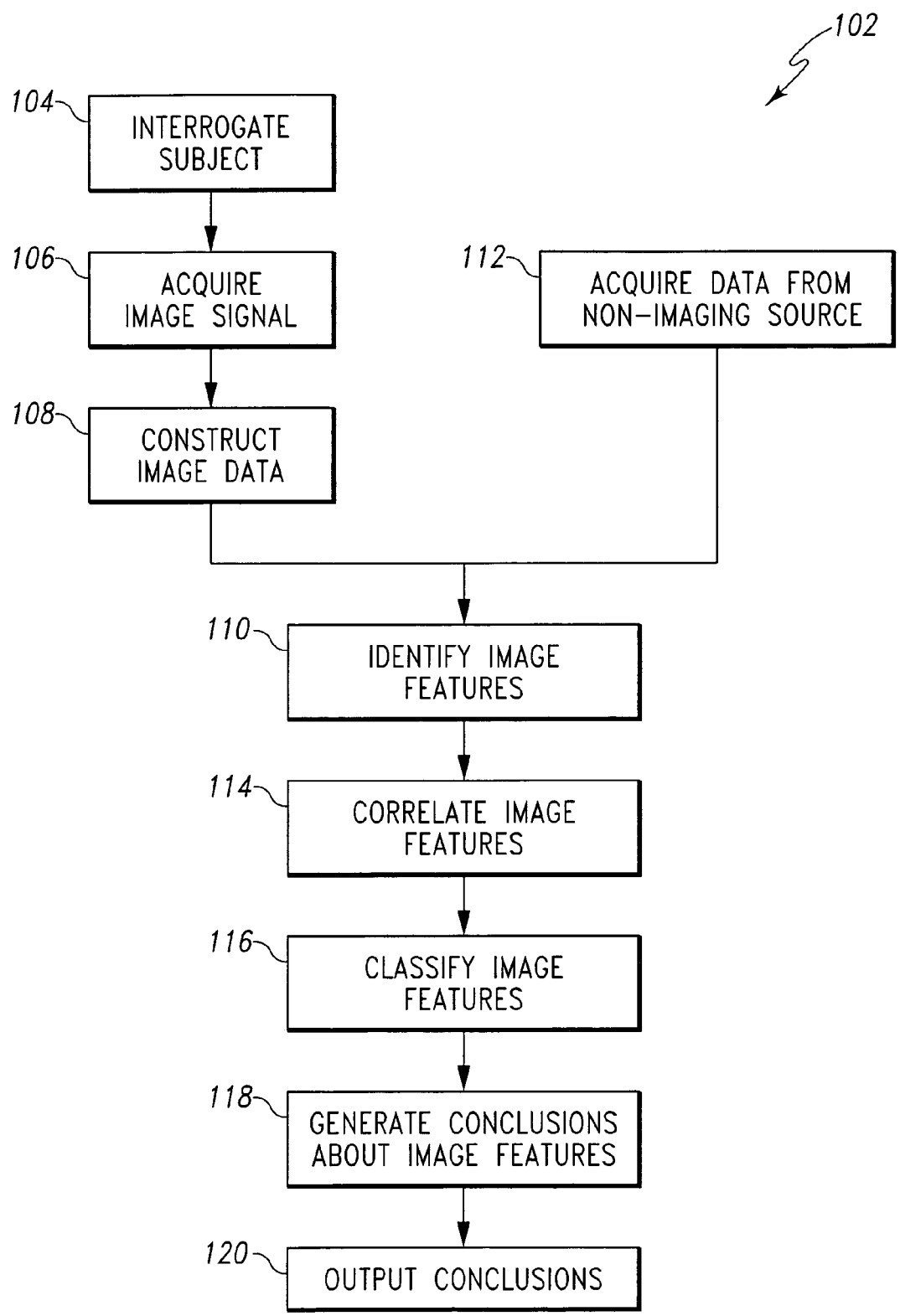
FIG. 3 is a general flow chart illustrating an example of a method of operation of an imaging system of FIG. 1 or FIG. 2.

A general flow chart 102, illustrating exemplary operation of surveillance system 30, is shown in FIG. 3. Two data acquisition phases are illustrated. Interrogating apparatus 32 interrogates a subject 38 at 104. Image information is detected during the interrogating and an image signal is produced. Processor 52 acquires the image signal at 106. The acquired image signal is then processed at 108 to construct image data. Image data is analyzed to identify image features at 110. As is explained further below, image features or characteristics may be any identifiable aspect of the image data or associated image, such as the magnitude, arrangement, or configuration of data, the shape, configuration, arrangement, texture, location of one or more objects 78 relative to a person's body 76, and/or features of the person's body, such as orientation, position, texture, specific body parts, size, shape, configuration, symmetry, or other appropriate aspect.

Where one or more input devices 60 is a source of subject information separate from an interrogating apparatus, such as a data base with information on a particular person, the data from a supplemental source may be acquired at 112. A supplemental source also may be a sensor that detects general features of the subject 38, such as the general detection of a substance, a feature identifying the person 72, or context data stored in a memory relating to the subject. Such supplemental image features may also be identified at 110. The existence of a substance, an identification of the person or a characteristic, class or categorization of the person, and other appropriate indicators or information may be features of the subject, in addition to features identified from the image data.

The various identified image features may then be correlated with each other at 114. For example, the identification of an object on the side of a person from an imaging apparatus may be correlated with the detection of metal in the middle zone of the person, a badge identifying the person, and context data previously stored in memory indicating that the person is a security guard and has high security clearance.

The identified or correlated features may then be classified at 116. Classification of features may be a logical process for determining the likelihood that detected features correspond to a suspect object or a false alarm. For example, the detection of various characteristics or certain combinations of characteristics in the same zone of an image may indicate that the image portion is an object. Further, given that the person is identified as a security guard, it is highly likely that the object is a gun. Also, the person may be authorized to carry a gun in this position as part of her duties. The object would thus be given a high weight of being a suspect object, but given a low weight as a security risk, due to the status of the person as a security guard.

Any set of corresponding features can be assigned a corresponding relative indicator, such as weight, value or attribute. An area of a subject may thus be assigned a high value even though no image object is detected. For example, a sheet of plastic explosive taped to a person's body may appear smoother than the rest of the person's body. The structure of an object also may be the basis of assigning a value, such as dimensions, shape and edge characteristics.

Once the image features are classified, then conclusions are produced at 118 about the combinations of image features. The conclusions may then be output at 120, as appropriate, such as via a display, report or alarm condition.

Use of Images in the Figures

Figure 4:
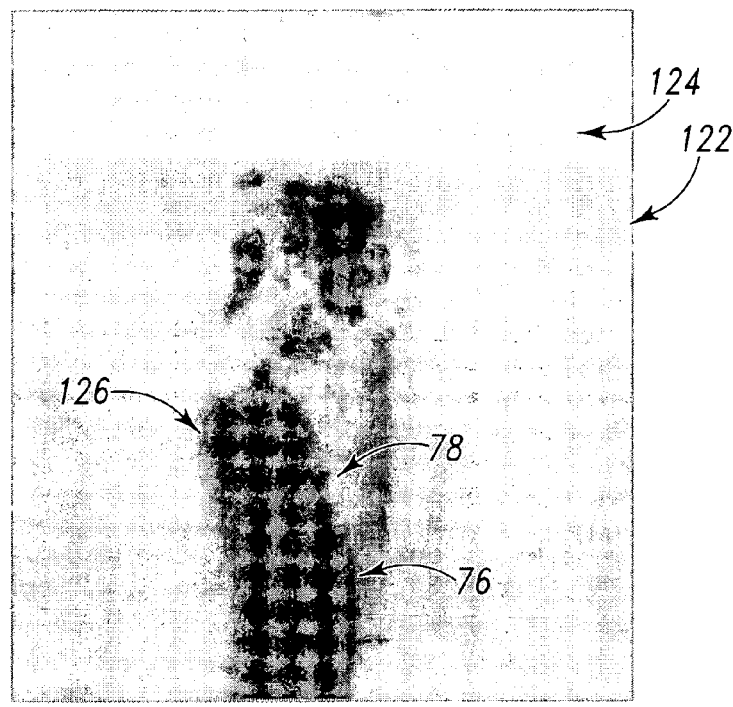
FIG. 4 is a representative image from an imaging system of FIG. 1 or FIG. 2 using a full frequency band of electromagnetic radiation.

The remaining figures include images that illustrate various exemplary procedures and/or features of image data received or produced by a processor, such as data received from an interrogating apparatus 32 of a subject. Generally, these images represent data. The steps described may be performed without actually producing a displayed image, or without producing data that provides visual characteristics suitable for display. An image may be formed as a matrix of picture elements, also referred to as pixels, or simply pels. The images in the figures are intended to facilitate an understanding of the processes described, and are not necessarily a part of the associated process. In FIG. 4, an image 110 of a subject 28 may include portions of the image that relate to the subject and portions of the image that relate to the background, including structure other than the subject. A distinction between the background and subject may be provided in an image by variation in a value of a feature, such as intensity, color and/or a topographical data, such as depth or distance from a reference.

Most of the graphical images included in the figures are shown in a reverse image format (intensity values are reversed) in order to produce lighter images. In the original images, the background is dark and the subject is light, similar to an expected visual view of a lighted subject before a dark background. Lighter images tend to be more accurately reproduced using such duplicating equipment as printers, copiers and scanners. Thus, although images in which subjects are shown with lighter, and therefore brighter, intensities may be more readily and realistically perceived, it will be appreciated that the methods disclosed and discussed apply to either form of representation, or to any representation or valuation of data or characteristic that provides a distinction, whether or not suitable for display.

In the example shown in FIG. 4, image 122 includes a relatively light background portion 124 and a darker subject portion 126. Accordingly, in this representation format, the background generally has an intensity level above (lighter than) a threshold, and the subject generally has an intensity level below the threshold.

Due to the nature of the particular interrogating apparatus 32 used to produce the image data used in the examples disclosed herein, there may be inconsistencies or anomalies in portions of the image where the background has intensity levels similar to those of the subject, and the subject has intensity levels similar to the background. Image data corresponding to image 122 may be analyzed to determine features of the subject, such as the location of the body or a body part, or the location of any objects included in the subject. This analysis may include or be based in whole or in part on an analysis of any appropriate feature or features of the data, such as the intensity levels of the pixels. Determination of a selected aspect of the image may include one or more features of the data.

Frequency-Based Imaging

FIGS. 4–10 illustrate an example of a method for relating image differences based on frequency of transmitted electromagnetic radiation. Different surfaces reflect electromagnetic energy to different degrees. Further, a particular surface may reflect electromagnetic energy of different frequencies differently. For example, FIG. 4 illustrates an image 122 produced based upon reflectivity of electromagnetic radiation transmitted onto a subject 38 over a frequency band of 24 GHz to 30 GHz. Signals representative of the reflectivity or reflectance of the transmitted radiation for different depths of the subject are received from interrogating apparatus 32. Generally, the intensity values of the image indicate a subject portion 124 and a background portion 126. The term depth is used to refer to the relative distance from a reference plane, such as corresponding or related to a position of the antenna elements 92. For example, FIG. 2 illustrates a position on subject 38 that may have a physical distance or depth D1 from the antenna elements. Image 122 is formed of picture elements, or pixels, that have intensities determined from the radiation reflected from the subject. The image is produced by selecting from the signals for all of the frequencies transmitted, the maximum reflectivity for each picture element.

Image 122 may be considered a more detailed image overall, since it is based on the data for received radiation for all transmitted frequencies. However, it may be useful to relate data received for different frequencies or frequency bands, in the event that a person may be carrying, or otherwise supporting an object that reflects electromagnetic radiation of different frequencies differently than does the person's body. This may be achieved in a method of surveilling a subject including irradiating at least a portion of the subject with electromagnetic radiation in at least first and second different frequency ranges having frequencies that are more than about 100 MHz and less than about 2 THz; receiving the irradiated electromagnetic radiation reflected from the subject; producing, from the received electromagnetic radiation, first image data representative of a first image of at least the portion of the subject based at least in part on reflectivity of the electromagnetic radiation in the first frequency range; producing, from the received electromagnetic radiation, at least second image data representative of at least a second image of at least the portion of the subject based at least in part on reflectivity of the electromagnetic radiation over at least the second frequency range; and relating at least the first and second image data.

Figure 5:
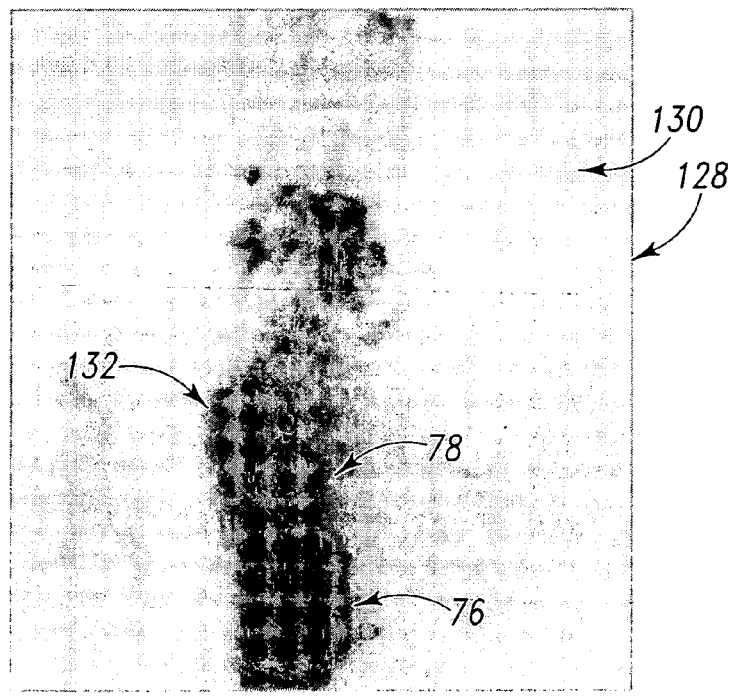
FIG. 5 is a representative image from an imaging system of FIG. 1 or FIG. 2 using a first range of frequencies of electromagnetic radiation.
Figure 6:
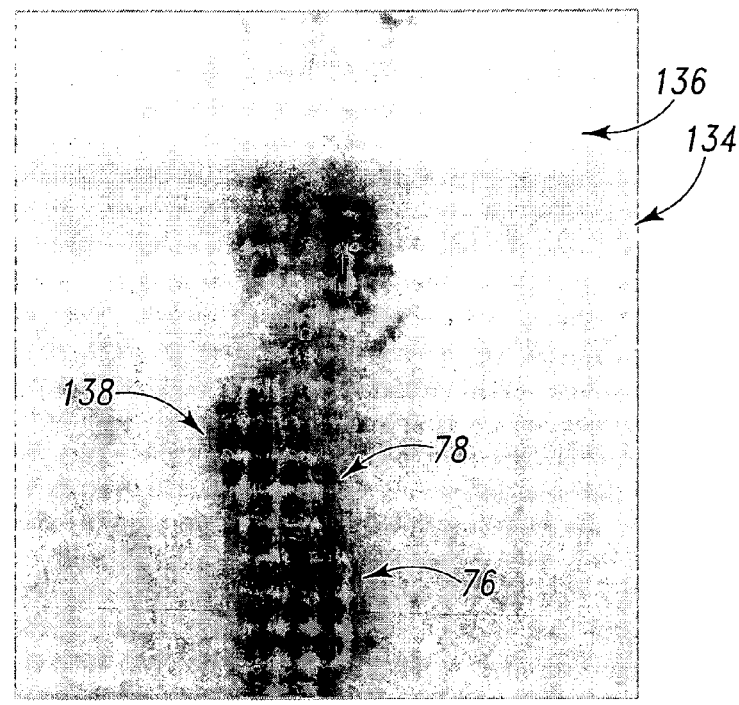
FIG. 6 is a representative image from an imaging system of FIG. 1 or FIG. 2 using a second range of frequencies of electromagnetic radiation.
Figure 7:
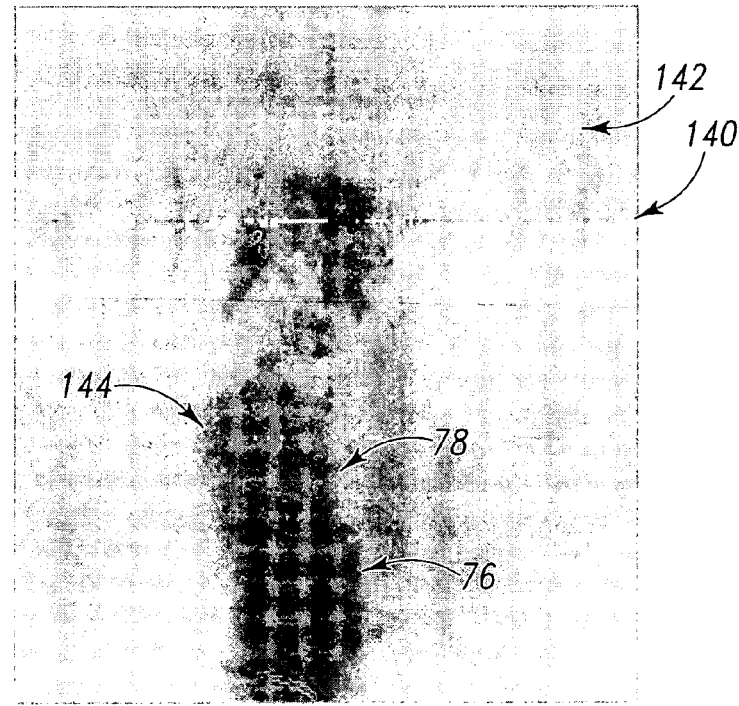
FIG. 7 is a representative image from an imaging system of FIG. 1 or FIG. 2 using a third range of frequencies of electromagnetic radiation.

In one example of performing such a method, image date for a plurality of frequency ranges is produced, with a frequency range having one or more frequencies. FIG. 5 illustrates an image 128 including a generally light background portion 130 and a generally dark subject portion 132, for radiation in a frequency band of 24–26 GHz. Similarly, FIG. 6 illustrates an image 134 including a generally light background portion 136 and a generally dark subject portion 138, for radiation in a frequency band of 26.1–28 GHz, and FIG. 7 illustrates an image 140 including a generally light background portion 142 and a generally dark subject portion 144, for radiation in a frequency band of 28.1–30 GHz.

It is seen that images 128, 134 and 140 are different from each other, and different from image 122. As it turns out, the person in the subject scanned has an object 78 supported on the side below the right arm. This object takes on different appearances relative to the person's body 76 in each of the figures. Such differences may be useful is identifying the object, which identification may be performed by data analysis or by evaluation by a user observing displays of the images. In order to enhance the observation of differences in the images, each image may be assigned a distinguishing characteristic, such as an image pattern, intensity level or color. Each of images 128, 134 and 140 are grayscale images derived from color images. In this example, the pixels in these images were assigned the colors of red, green and blue, respectively. This is at least part of the reason that the general intensity levels of these images differ.

The different images produced from data for different frequency ranges may be displayed serially or concurrently to an observer, to assist the observer in identifying differences between the images. The areas of such differences may correspond to image anomalies, which may include objects. Directing an observer's attention to the anomalies may hasten the identification of objects.

Figure 8:
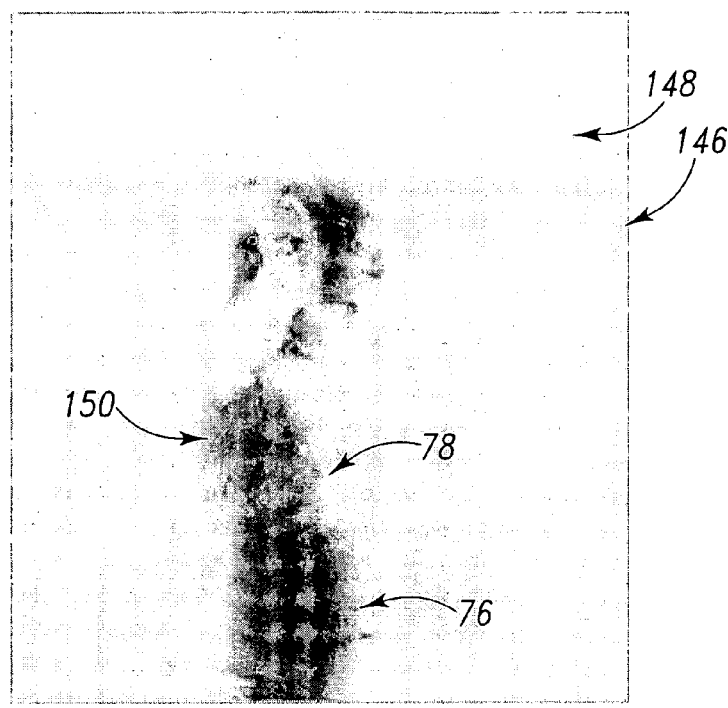
FIG. 8 is an image produced from the images of FIGS. 5–7.

Optionally, an image formed as a composite of the separate images may also be used to identify differences between the images. For example, an image may be formed by displaying each of the image characteristics simultaneously. In the case of color images, the colors may be combined to form different ranges of colors. Such an image 146 is illustrated in FIG. 8. As with the previous images, image 146 includes a background 148 and a subject 150. Subject 150 corresponds to a person's body 76 and an object 78. Image 146 was formed by directly adding the colors and definition of the individual images 128, 134 and 140. Because each image was formed with less information than image 122, it has reduced detail definition or clarity.

Figure 9:
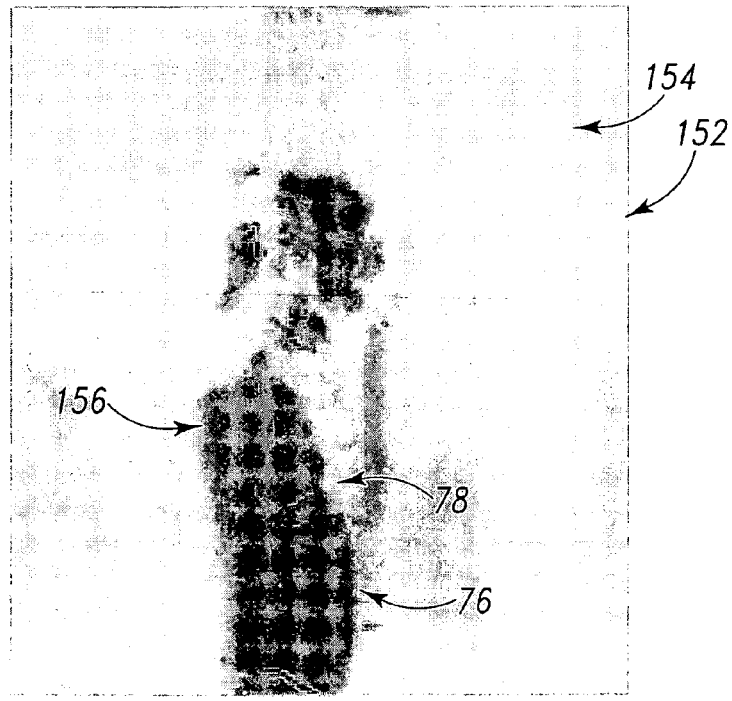
FIG. 9 is the image that is produced from the images of FIGS. 4 and 8.

An image 152 with improved clarity is depicted in FIG. 9. Image 152 includes a background 154 and a subject 156. This image consists of image 122, being an image of greater detail than image 146, but with the addition of the colors from image 146. This image was enhanced by increasing the brightness, contrast, and color saturation. Other image enhancing techniques may also be used. In regions of this image where one of the component colors of red, green and blue dominate, it is apparent that this is a region for which the subject produced the highest level of reflectivity for the three frequency ranges. In regions where reflectivity was more balanced between two or three of the frequency ranges, the image has a color produced by the combination of component colors. For example, a combination of blue and red colors appears as purple.

Figure 10:
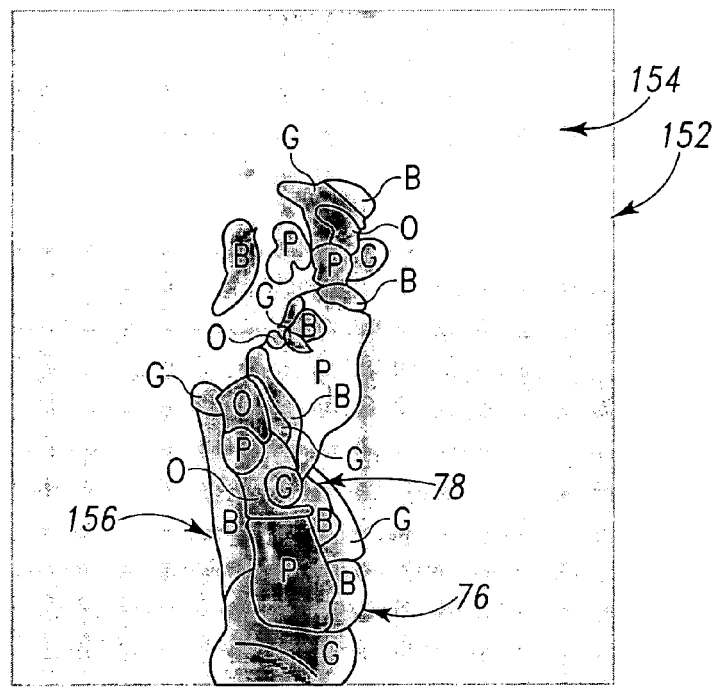
FIG. 10 is the image of FIG. 9 modified to illustrate changes in the image of FIG. 4.

Since color differences are difficult to distinguish in a black and white image, generalized and oversimplified regions of image 152 having different colors are outlined in FIG. 10 to facilitate the visualization process that would be apparent from the original color image. In FIG. 10, the letters associated with different regions stand for the first letter of the corresponding colors of Red, Blue, Green, Orange and Purple. Red, green and blue represent dominant reflectivity in the low, medium and high frequency bands, respectively. It is seen that there are a variety of colors making up the image. The central area of the torso is made up of a mix of colors, indicating comparable reflectivity for different frequency bands. The perimeter regions of the torso, though, appear to be dominated by blue along the sides and green in the hip or abdominal region. An exception to this general configuration is a green region positioned near where object 78 is located. There are other localized color regions as well. The existence of a limited colored region, or region of dominance of reflectivity of one of a plurality of frequency bands, or of a particular frequency band may indicate a suspect area of the image, where closer observation may be warranted, or when combined with the classification of other features, may increase the confidence level in a conclusion that the area is a suspect area. Different frequencies and ranges of frequencies may produce different results.

Depth-Based Image Reconstruction

FIGS. 11–18 illustrate a method of producing surveillance images having reduced depth variance. This may result in images with improved resolution, clarity and/or depth-related information. In one example, a method of surveilling a subject may include irradiating at least a portion of the subject with electromagnetic radiation having one or more frequencies between about 100 MHz and about 2 THz. The irradiated electromagnetic radiation reflected from the subject may then be received and processed. Processing may include producing, from the received electromagnetic radiation, at least first image data representative of at least the portion of the subject based at least in part on reflectivity of the electromagnetic radiation for a plurality of depths for each of a plurality of picture elements or pixels. A first depth for each of the plurality of pixels may be selected based at least in part on the reflectivity of the electromagnetic radiation at at least the first depth. A second depth for each of the plurality of pixels may be selected based at least in part on the first depth of at least another one of the pixels. Reflectivity of the electromagnetic radiation at the second depth may be at least part of the basis for producing at least second image data representative of at least a first image of at least the portion of the subject.

Figure 11:
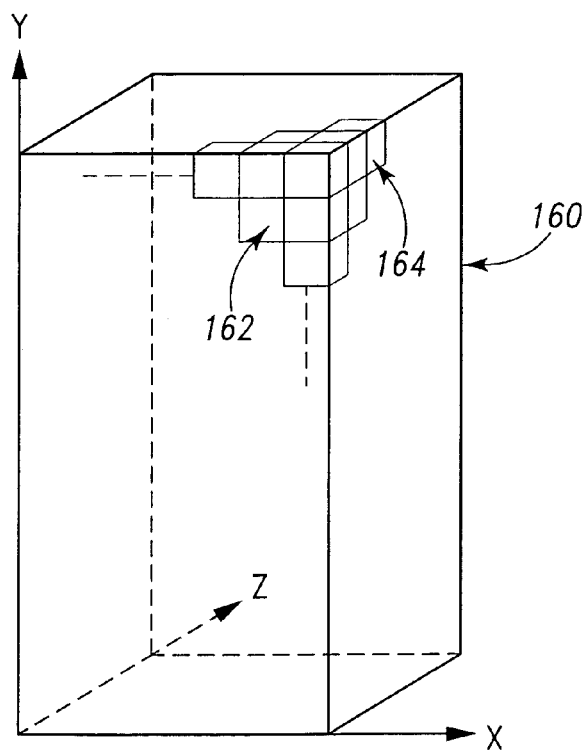
FIG. 11 is an image of three-dimensional data space used to represent image data for an interrogated subject.
Figure 12:
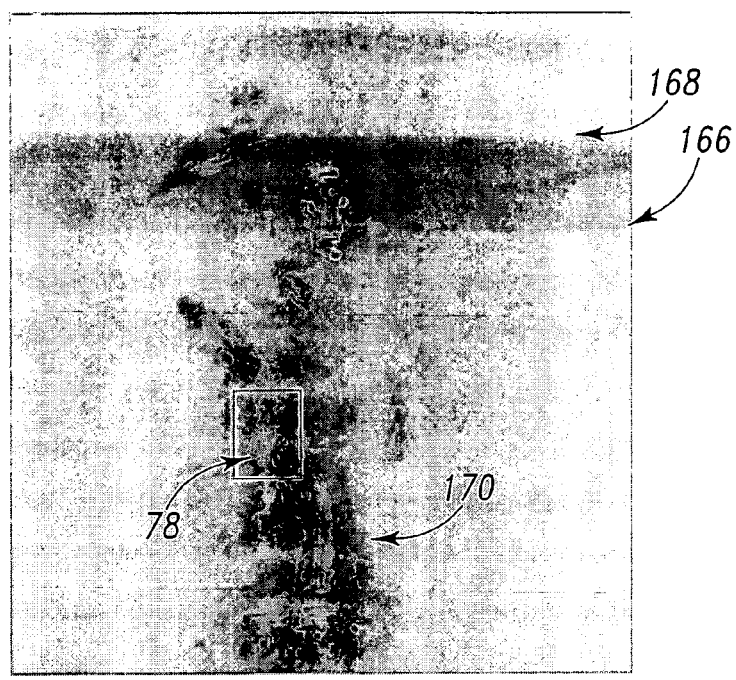
FIG. 12 is a representative image from an imaging system of FIG. 1 or FIG. 2 produced by using maximum reflectance values for each picture element.

FIG. 11 illustrates in simplified form what may be considered a three-dimensional data cube 160 corresponding to the organization of image data produced as a result of interrogating a subject with electromagnetic radiation. The X and Y-axes correspond to horizontal and vertical positions on a two-dimensional image. An X-coordinate and a Y-coordinate correspond to a pixel, such as pixels 162. The Z-axis represents relative depth, or distance from a reference. The image data then includes a series of cuboids for each pixel having values corresponding to a reflectivity for a transmitted electromagnetic radiation at that depth. Thus, for each depth z along the Z-axis, a cube of data space, referred to as a cuboid, volume element or voxel, such as voxels 164. For each pixel, then, there are a series of associated voxels, with each voxel corresponding to a particular depth and having a value representative of the reflectivity at that depth.

Images may be produced by selecting the maximum reflectivity from the series of voxels for each pixel. Image 166 of FIG. 12 was produced in this way. This figure, again with reverses-intensity, includes a background portion 168 and subject portion 170. The rectangular outline represents a window around an object 78. Image 166 was produced by first producing a data cube 160 for each frequency. Then, the maximum value of each voxel from the data cubes for all of the frequencies was selected to form a combined data cube. The maximum values of voxels for each data cube are used to produce a two-dimensional (x, y) image from a three-dimensional (x, y, z) data cube. Since the maximum reflectivity value for a given pixel may be for a depth that may vary from pixel to pixel, information about the surface of a subject at a given depth may be lost. For example, if the intensity value in a localized area drops off dramatically in the X or Y directions, that may not be apparent from an image based on the maximum reflectivity values.

Figure 13:
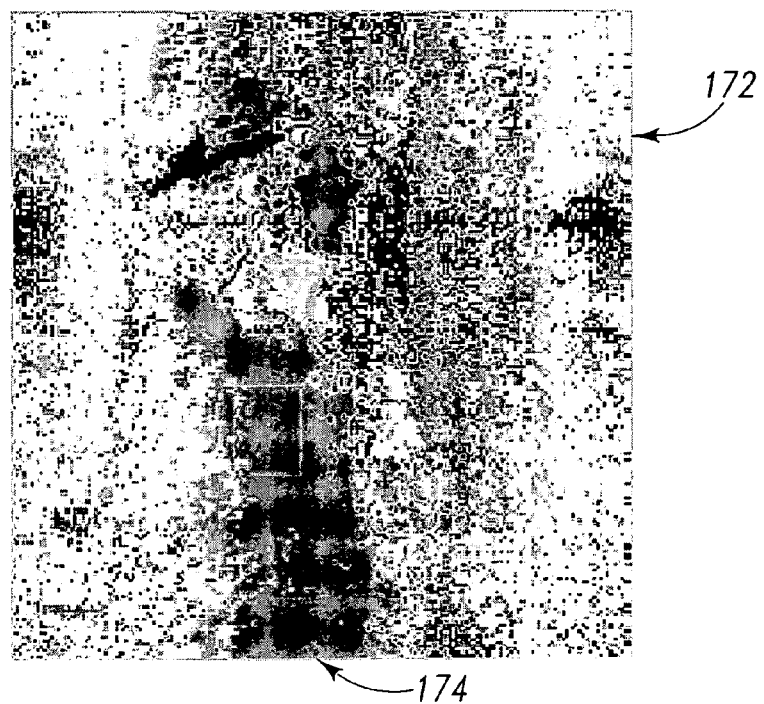
FIG. 13 is an image showing depths used for the image of FIG. 12.

FIG. 13 depicts an image 172 produced by mapping the z or depth values for the pixels making up image 166. In image 172, the darker the intensity value is for a pixel, the closer it is to the viewer or reference. Conversely, the lighter the value is, the further the position is from viewer. It is seen that there is a center portion 174, corresponding to the area of subject portion 170 of image 166, having pixels with generally intermediate intensity values, represented by intermediate shades of gray.

Figure 14:
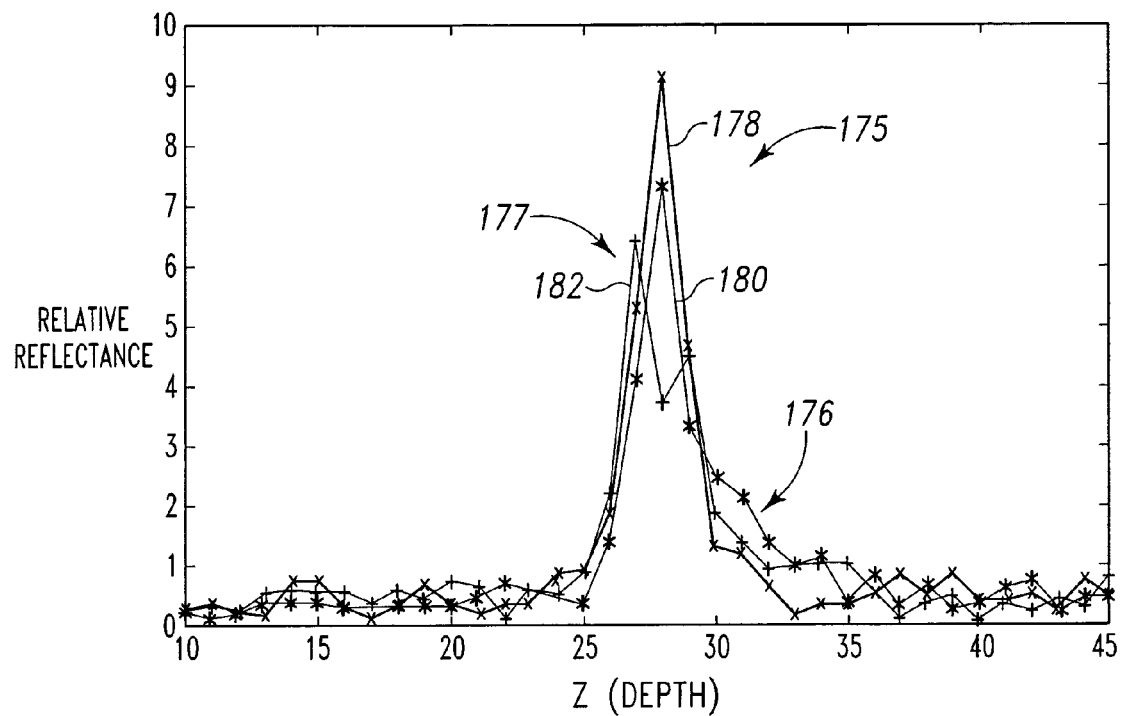
FIG. 14 is a chart showing reflectance as a function of depth for three adjacent picture elements in image data used to produce the image of FIG. 12.

FIG. 14 is a chart showing reflectance or reflectivity as a function of depth for three adjacent pixels within the object window shown in image 166. The three pixels then have respective sets 175, 176 and 177 of depth data. Line 178, connecting data points in set 175 indicated by the "x" symbols, has a maximum reflectance value of about 9.1 at a depth of 28. Similarly, line 180, connecting data points in set 176 indicated by the "*" symbols, has a maximum reflectance value of about 7.3, also at a depth of 28. Line 182, connecting data points in set 177 indicated by the "+" symbol, has a maximum reflectance value of about 6.4, at a depth of 27.

All three maximum values were used to produce image 166. It can be seen in FIG. 14, that if an image were formed using reflectance values for the same depth in at least local portions of the image, the image would be different. For example, the values at depth 28 may be selected, in which case the reflectance value for the pixel represented by line 182 would have been about 3.8 instead of about 6.4, making the change in reflectance, which may be due to an edge of an object, more pronounced.

Figure 15:
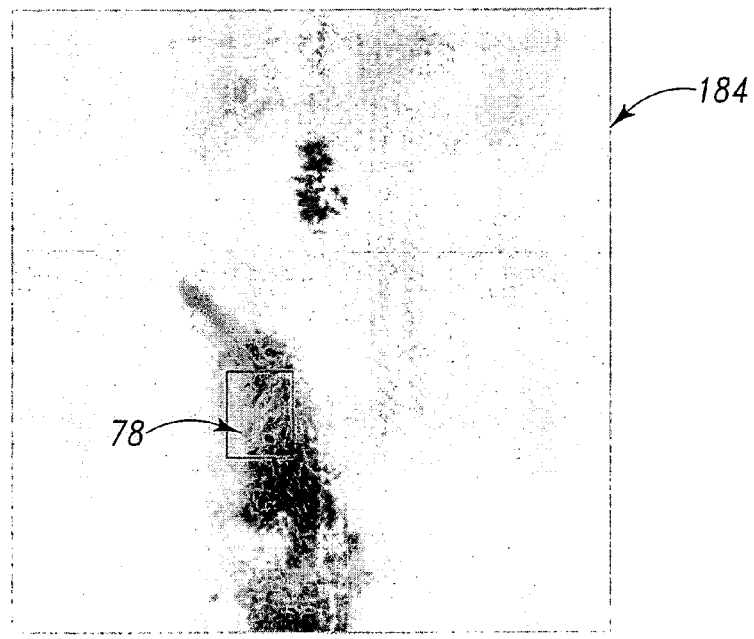
FIG. 15 is an image produced by using reflectance values existing at a common first depth corresponding to a maximum reflectance in the chart of FIG. 14.
Figure 16:
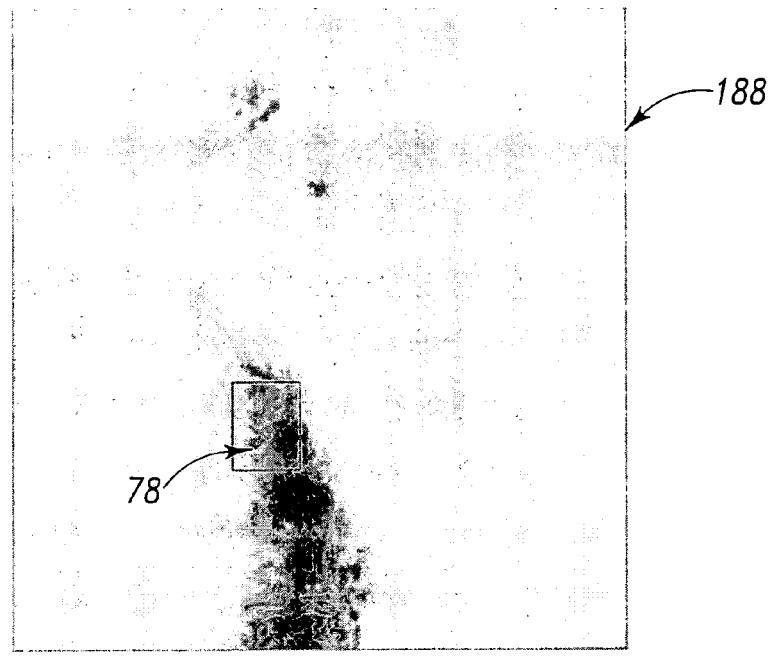
FIG. 16 is an image produced by using reflectance values existing at a common second depth corresponding to a maximum reflectance value in the chart of FIG. 14.

FIG. 15 is an image 184 produced by using reflectance values existing at a single first depth plane (single z value for all pixels) corresponding to a maximum reflectance in the chart of FIG. 14, such as depth 28. Similarly, FIG. 16 is an image 188 produced by using reflectance values existing at a single second depth corresponding to a maximum reflectance in the chart of FIG. 14, such as depth 27. Object 78 appears more salient in single depth-plane images 184 and 188, than in image 166 having the maximum values across all depth planes. However, parts of images 184 and 188 that are at significantly different depths are no longer visible on these depth planes. For example, the upper portion, corresponding to the head of the person in the subject, is at a further depth, and so tends to not be visible in the selected depth planes.

A more complete image may be realized by localizing the depth plane in different portions of an image. One approach for doing this, is to limit the change in depth planes over localized regions, such as within a select group associated to a given pixel. The group may be related to the selected pixel in different ways, such as within a selected distance or position relative to a selected pixel, or within a selected window or kernel of pixels that may contain the given pixel. In one example, an m×n kernel may be considered, where m and n are integers and the given pixel is in the kernel, or even in the center of the kernel when odd integers are selected for the kernel size. Other group selections may be made, as appropriate in a given application.

Various criteria may be used for making depth plane selection more consistent in localized areas. For example, a depth-controlled image may be produced for an area identified as being suspect based on automatic or manual classification of other features. Optionally, an algorithm may be applied to an image, such as a set of selection criteria or a numerical selection function, as appropriate.

In some examples, numerical functions may be applied to an image produced based on data characteristics, such as maximum reflectance values as were used to produce image 166. As a specific example, the median or mean of a local region of depth values represented by image 172 in FIG. 13, may be selected. As another example, a mode may be used to select a depth value for a given pixel. In a mode selection algorithm, a depth value for a selected pixel may be set the same as the depth value that occurs most frequently or with at least a threshold frequency. If no depth value occurs with at least the threshold frequency, then a mean, median or other value may be selected.

Figure 17:
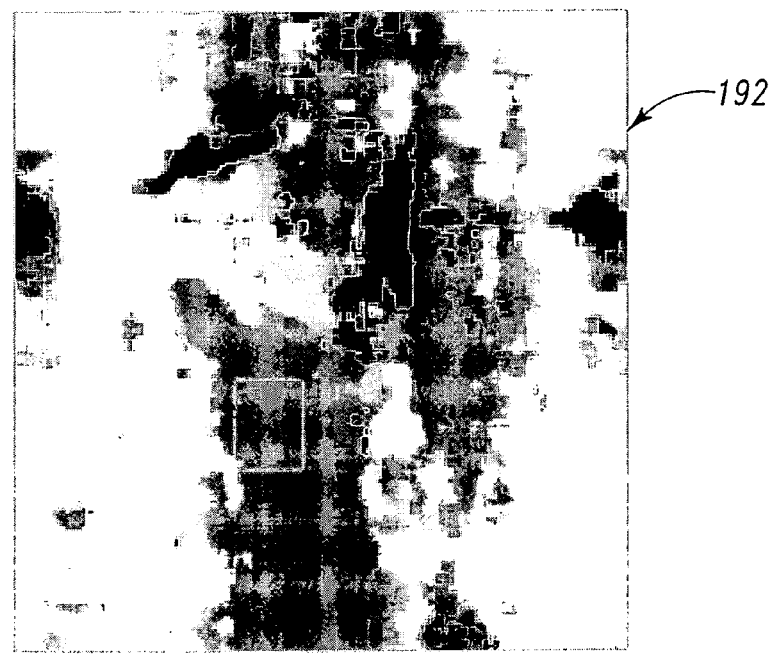
FIG. 17 is an image of depths selected in a depth filter algorithm.

FIG. 17 is an image 192 of depths selected in a depth filter algorithm. Specifically, image 192 was produced using the median as a filter to apply to the depth data for an image, such as to the depths having maximum reflectance values for the pixels as illustrated by image 172 in FIG. 13. This algorithm selects the same or nearly the same depth plane for a pixel as a depth plane of other nearby pixels, thereby expanding those regions having a common depth plane. Regions characterized by a variety of depth planes may still have a variety of depth planes, albeit a reduced variety of depth planes. Visually, it is seen that the localized spatial variance is reduced, and general uniformity of depth in localized regions is increased.

FIG. 18 depicts an image 196 produced using the depth values for each pixel that is depicted in depth image 192. Comparing this image to image 166, boundaries at object transitions in depth are more apparent, such as shown by the object image area, and yet the whole body image is visible. Further, some of the noise and non-relevant pixels have been removed, making the image cleaner. For example, a horizontal line in the upper portion of image 166 is gone, because nearby pixels used different depth planes. Although a median filter was used in this example, a modified median filter, mode, or other kinds of linear, nonlinear, or other types of filters may be used, as appropriate.

Depth-Based Imaging

Figure 20A:
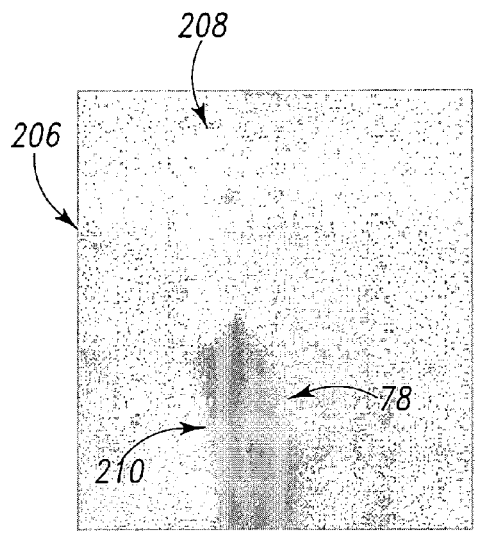
FIG. 20A is an image produced by using reflectance values in a second depth plane.
Figure 20B:
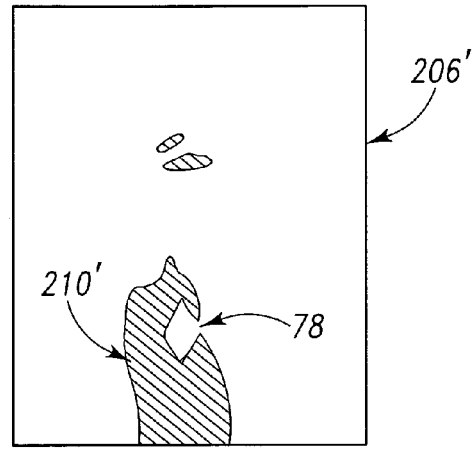
FIG. 20B is an image illustrating generally the areas of higher reflectance values in the image of FIG. 20A.
Figure 21A:
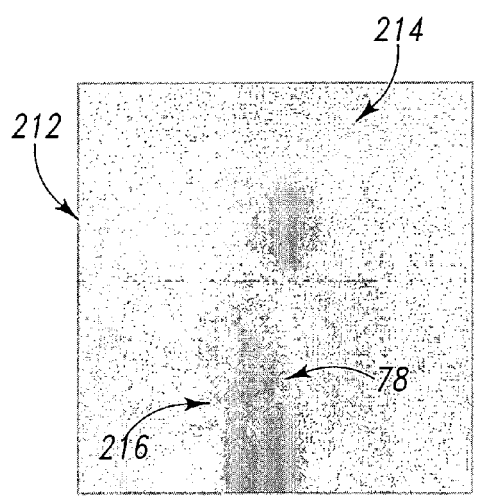
FIG. 21A is an image produced by using reflectance values in a third depth plane.
Figure 21B:
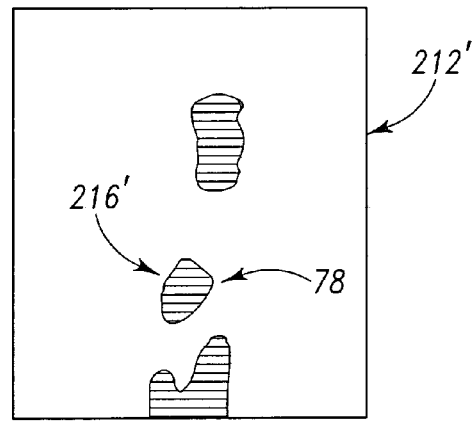
FIG. 21B is an image illustrating generally the areas of higher reflectance values in the image of FIG. 21A.

As noted above with reference to images 184 and 188, depicted in FIGS. 15 and 16, depth-plane images may provide image information that is not apparent in an image derived from a maximum reflectance value for each pixel. The relative differences between images at different depths may give meaningful information about a subject that is depicted in the images. As further examples of this, FIGS. 19A–21B illustrate different single-plane images from image data used to produce image 122 in FIG. 4. More specifically, FIG. 19A is an image 200, having a background portion 202 and a subject portion 204, produced by using reflectance values in a single first depth plane for all pixels. FIG. 19B is an image 200' illustrating generally and simplistically the areas of higher reflectance as subject portion 204' characteristic of the subject portion in the image of FIG. 19A. Similarly, FIG. 20A is an image 206, having a background portion 208 and a subject portion 210, produced by using reflectance values in a second depth plane. FIG. 20B is an image 206' illustrating generally the areas of higher reflectance as subject portion 210' in the image of FIG. 20A. FIG. 21A is an image 212, having a background portion 214 and a subject portion 216, produced by using reflectance values in a third depth plane. FIG. 21B is an image 212' illustrating generally the areas of higher reflectance in the image of FIG. 21A.

It is seen that in this example, each image is different in the area of object 78. In image 200, the object is not particularly discernable from the person's body. In image 206, the person's body is imaged, but the area of the object is not well imaged. In image 212, the contrary appears to exist. That is, the object area is more pronounced than the portion of the body immediately surrounding the object. Such features may be apparent when each image is or the images are displayed for an operator of the imaging system, or may be useful for automatic classification of these features, such as by comparison of images or comparison of an image with an expected or reference image.

FIG. 22 is an image 220 formed as a set of side-by-side images 200, 206 and 212 of FIGS. 19A, 20A and 21A, respectively. By presenting sequential depth plane images concurrently on a display, as shown, or by displaying them serially, such as in the same position, such differences may become apparent to an observer. When identified, suspect areas may be imaged in greater detail, or the suspect areas of the person imaged may be physically searched to determine the nature of any objects found in these areas.

Viewing and/or identifying differences between the depth plane images may be further enhanced by assigning them with distinguishing characteristics, such as a graphic pattern, intensity level, or color. By assigning the subject of each image with a different color, for instance, differences between the images can be readily identified by differences in the colors. When the colored images are used to form a composite image that is a combination of the different images, the areas of difference may appear as distinct colors and the areas of similarity may be a color or colors formed by the combination of the separate image colors. FIG. 23A is an image 224 having a background portion 226 and a subject portion 228 formed by combining the images of FIGS. 19A, 20A and 21A. In an example in which the subject portions of images 200, 206 and 212 are assigned the respective colors of blue, green and red with brightness corresponding to the respective reflectivity, the torso appears generally green, the object area and abdominal and hip area appear generally blue with red undertones, and the head appears primarily red with some blue undertones. In this particular example, then, the object area appears very distinct, and would readily be apparent to a system operator or observer viewing the color image, or may be automatically detected.

Because the distinction between colors is not very apparent in the black and white image of FIG. 23A, the combination of colors is illustrated in FIG. 23B as a very general and inaccurate combination of images 200', 206' and 212' collectively represented as a composite image 224' having a mixed subject portion 228'. The overlap of patterned subject portions illustrate, though, how the different images can produce areas of base colors (without overlap) and areas of new colors formed by the overlap of base colors, depending on the brightness of the individual colors.

It will be appreciated that the images 200, 206 and 212 are based on reflectance values in a single depth plane or depth value for all pixels in the images. These depth planes may be adjacent depth planes or depth planes that are spaced apart by a plurality of incremental depth values. Similar images may also be produced based on a first image made of reflectance values from different depth values for different pixels. An example of this is image 166 of FIG. 12 in which the maximum reflectance value is selected for each pixel. One or more images may then also be produced that are selected depth values spaced from the depth values for which reflectance values were selected for the first image. For example, images produced from reflectance values at a distance one or more depth increments may be used for comparison. Similar approaches may be used for producing comparative images based on other first images of interest.

Imaging with Increased Precision

As discussed above, image data may be produced by sampling data at discrete points for a data cube having discrete voxels or discrete depth values for each pixel. As a result, data between the discrete points is not available. If that data were available, additional image detail would be available. However, assuming that the information is continuous and varies predictably between discrete data points, increased image precision may be provided by estimating any change in data between data points. Generally, a method of surveilling a subject may include irradiating at least a portion of the subject with electromagnetic radiation having one or more frequencies between about 100 MHz and about 2 THz, receiving the irradiated electromagnetic radiation reflected from the subject, producing, from the received electromagnetic radiation, at least first image data representative of at least the portion of the subject based at least in part on reflectivity of the electromagnetic radiation for a plurality of spaced-apart first depths for each of a plurality of adjacent picture elements, and determining a value of reflectivity for an intermediate depth between two adjacent first depths.

One way that this may be done is to fit the data points to a continuous or discontinuous numerical function. A simple approach is to determine values using a rectilinear line containing adjacent discrete data points. Values at points on the line between the discrete data points may be used as an estimate of the data at those points. In regions where the data is progressively increasing, decreasing or constant, this may provide a reasonable approximation of, in this case, reflectivity values between the data points. However, in regions where the data changes non-proportionally, this method may produce imprecise values.

Figure 24:
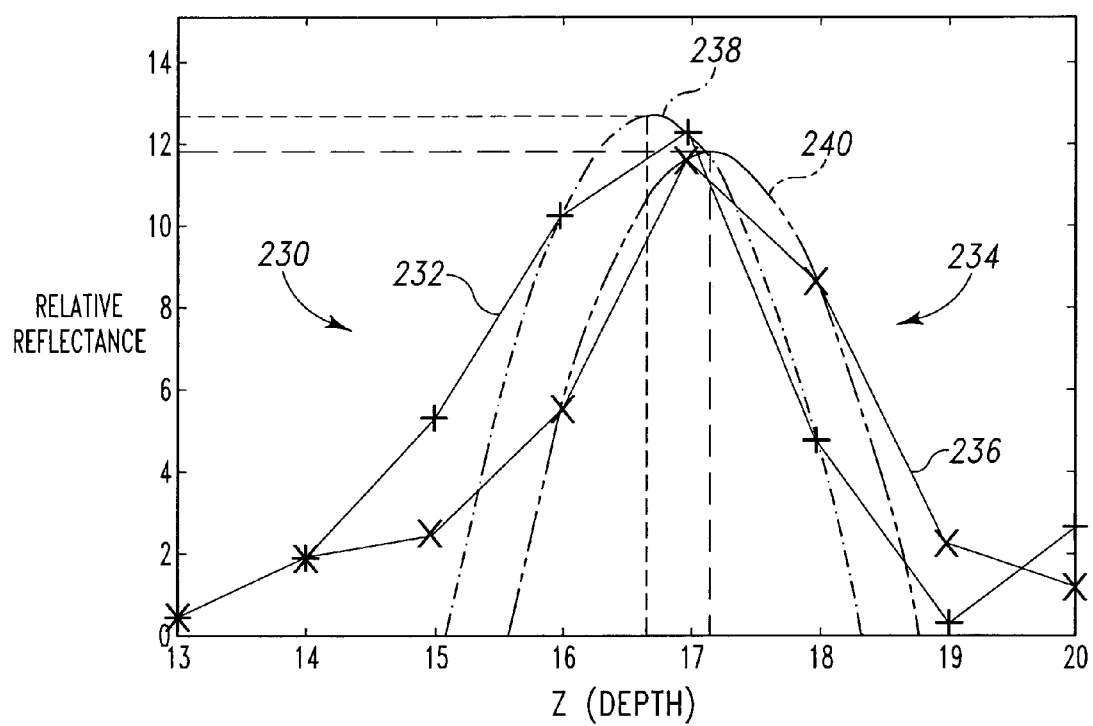
FIG. 24 is a chart of reflectance value as a function of depth for two representative picture elements and illustrating an interpolation algorithm.

Of particular interest in imaging systems using reflectivity of electromagnetic radiation for imaging of a subject, the locations and magnitudes of maximum reflectivity for discrete picture elements are indicative of the location of the surface of the subject. FIG. 24 is a chart of reflectance as a function of depth for two representative picture elements of a data cube resulting from interrogating a subject with electromagnetic radiation. In this example, a first set 230 of reflectance values for different depths are identified by the "+" symbols connected by a line 232. A second set 234 of reflectance values for different depths are identified by the "x" symbols connected by a line 236. The reflectance values for each set are given for each discrete relative depth value between 13 and 20. The maximum values for both of sets 230 and 234 are at depth value 17. Based strictly on the discrete values, then, it would appear that the surface of the subject is at the same depth for the pixels associated with these sets.

Lines 232 and 236 form generally bell-shaped curves, with line 232 generally disposed to the left of line 236. This would seem to indicate that the actual maximum for set 230 may be to the left of the maximum for set 234. Assuming that reflectance varies continuously as a function of depth value, an estimate of the location and magnitude of a maximum value based on the discrete points may be determined by predicting how the reflectance varies in the vicinity of the maximum. It has been found that a more likely maximum may be determined from each of the sets of depth-based values by fitting a polynomial to data points including the maximum data points.

In particular, an inverse parabolic interpolation may be performed based on the maximum data point and the data point on each side of the maximum data point. Thus, in this example, the reflectance values for depth values of 16, 17 and 18 are used. In the case of set 230 of reflectance values, a parabolic curve 238 is determined that passes through the three data points of set 230. Curve 238 has a maximum value of about 12.7 at an intermediate depth value of about 16.6. As might be expected, a parabolic curve 240 containing the three data points of set 234 of reflectance values is positioned to the right of curve 238. Curve 240 has a maximum at a reflectance value of about 11.8 at an intermediate depth value of about 17.1.

By applying an interpolation algorithm to the set of reflectance values for each of the pixels in an image data cube, different maximum values are produced that in turn alter an image produced based on the maximum values. In particular, the intensity, brightness, color, or other image characteristic values are changed. The resulting image may be more precise than an image based only on discrete values, and may make objects held by a person to be more distinguishable. Such an approach may be applied between other discrete data points, such as x or y-values of pixels.

INDUSTRIAL APPLICABILITY

The methods and apparatus described in the present disclosure are applicable to security, monitoring and other industries in which surveillance or imaging systems are utilized.

While embodiments of imaging systems and methods of imaging have been particularly shown and described, many variations may be made therein. This disclosure may include one or more independent or interdependent inventions directed to various combinations of features, functions, elements and/or properties, one or more of which may be defined in the following claims. Other combinations and sub-combinations of features, functions, elements and/or properties may be used. Such variations, whether they are directed to different combinations or directed to the same combinations, whether different, broader, narrower or equal in scope, are also regarded as included within the subject matter of the present disclosure. The foregoing embodiments are illustrative, and no single feature or element is essential to all possible combinations that may be claimed in this or later applications. The claims, accordingly, define inventions disclosed in the foregoing disclosure, but any one claim does not necessarily encompass all features or combinations that may be claimed.

Where the claims recite "a" or "a first" element or the equivalent thereof, such claims include one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

The invention claimed is:

1. A method of surveilling a subject comprising:
   irradiating at least a portion of the subject with electromagnetic radiation having one or more frequencies between about 100 MHz and about 2 THz;
   receiving the irradiated electromagnetic radiation reflected from the subject;
   producing, from the received electromagnetic radiation, at least first image data representative of at least the portion of the subject based at least in part on reflectivity of the electromagnetic radiation for a plurality of depths for each of a plurality of picture elements;
   selecting a first depth for each of the plurality of picture elements based at least in part on the reflectivity of the electromagnetic radiation for at least a picture element;
   producing at least second image data representative of at least a first image of at least the portion of the subject corresponding to the first depth for each of the plurality of picture elements;
   selecting at least a second depth for each of the plurality of picture elements based at least in part on the first depth of at least a picture element; and
   producing at least third image data representative of at least a second image of at least the portion of the subject corresponding to the second depth for each of the plurality of picture elements.

2. The method of claim 1, in which selecting a first depth includes selecting a first depth corresponding to a depth at which the reflectivity is a maximum for the corresponding picture element.

3. The method of claim 1, in which selecting a second depth includes selecting a second depth for each picture element that is spaced a predetermined depth from the first depth.

4. The method of claim 3, in which selecting a second depth includes selecting a second depth that is adjacent to the first depth for each pixel.

5. The method of claim 3, in which selecting a first depth includes selecting a first depth that is the same for all picture elements.

6. The method of claim 1, in which producing first image data and producing at least second image data each includes producing image data corresponding to a three-dimensional holographic image of at least a portion of the subject.

7. The method of claim 1, further comprising relating at least the first and second image data.

8. The method of claim 7, in which relating image data includes assigning at least a first color to the first image data and at least a second color to the second image data and combining the first image data with the first color and the second image data with the second color.

9. The method of claim 7, in which relating image data includes displaying first image data with second image data.

10. The method of claim 7, in which relating image data includes assigning at least a first characteristic to the first image data and at least a second characteristic to the second image data and combining first image data having the first characteristic and second image data having the second characteristic.

11. The method of claim 10, in which the first and second characteristics are colors.

12. An imaging system comprising:
    an interrogating apparatus configured to transmit toward and receive from a subject in a subject position, electromagnetic radiation having one or more frequencies between about 100 MHz and about 2 THz, the interrogating apparatus producing an image signal representative of the received radiation; and
    a controller adapted to produce, from the received electromagnetic radiation, at least first image data representative of at least the portion of the subject based at least in part on reflectivity of the electromagnetic radiation for a plurality of depths for each of a plurality of picture elements, to select a first depth for each of the plurality of picture elements based at least in part on the reflectivity of the electromagnetic radiation for at least a picture element, to produce at least second image data representative of at least a first image of at least the portion of the subject corresponding to the first depth for each of the plurality of picture elements, to select at least a second depth for each of the plurality of picture elements based at least in part on the first depth of at least a picture element, and to produce at least third image data representative of at least a second image of at least the portion of the subject corresponding to the second depth for each of the plurality of picture elements.

13. The system of claim 12, in which the controller is further adapted to select a first depth corresponding to a depth at which the reflectivity is a maximum for the corresponding picture element.

14. The system of claim 12, in which the controller is further adapted to select a second depth for each picture element that is spaced a predetermined depth from the first depth.

15. The system of claim 14, in which the controller is further adapted to select a second depth that is adjacent to the first depth for each pixel.

16. The system of claim 14, in which the controller is further adapted to select a first depth that is the same for all picture elements.

17. The system of claim 12, in which the controller is further adapted to produce image data corresponding to a three-dimensional holographic image of at least a portion of the subject.

18. The system of claim 12, in which the controller is further adapted to relate at least the first and second image data.

19. The system of claim 18, in which the controller is further adapted to assign at least a first color to the first image data and at least a second color to the second image data, and to combine the first image data with the first color and the second image data with the second color.

20. The system of claim 18, in which the controller is further adapted to display first image data with second image data.

21. The system of claim 18, in which the controller is further adapted to assign at least a first characteristic to the first image data and at least a second characteristic to the second image data, and to combine first image data having the first characteristic and second image data having the second characteristic.

22. The system of claim 21, in which the first and second characteristics are colors.

* * * * *